(No Model.) 2 Sheets—Sheet 1.

C. G. TOENSE.
DIFFERENTIAL HOISTING GEAR.

No. 366,278. Patented July 12, 1887.

WITNESSES:
D. Petri-Palmedo
Martin Petry

INVENTOR
Carl G. Toense
BY Goepel & Raegener
ATTORNEY (No Model.) 2 Sheets—Sheet 2.

C. G. TOENSE.
DIFFERENTIAL HOISTING GEAR.

No. 366,278. Patented July 12, 1887.

WITNESSES:
D. Petri-Palmedo
Martin Petry

INVENTOR
Carl G. Toense
BY Goepel & S. Waegener
ATTORNEY

UNITED STATES PATENT OFFICE.

CARL G. TOENSE, OF CLEVELAND, OHIO.

DIFFERENTIAL HOISTING-GEAR.

SPECIFICATION forming part of Letters Patent No. 366,278, dated July 12, 1887.

Application filed September 3, 1886. Serial No. 212,574. (No model.)

*To all whom it may concern:*

Be it known that I, CARL G. TOENSE, of Cleveland, in the county of Cuyahoga and State of Ohio, have invented certain new and useful Improvements in Differential Hoisting-Gear, of which the following is a specification.

The object of this invention is to provide a new and improved differential hoisting-gearing, in which the friction is reduced to a minimum, and which hoist is of simple construction.

The invention consists of the combination, with a drum having a toothed ring on the inside, of reciprocating pawls operated by an eccentric from the driving-shaft within the drum, all as will be fully described and set forth hereinafter, and pointed out in the claims.

Figure 1:
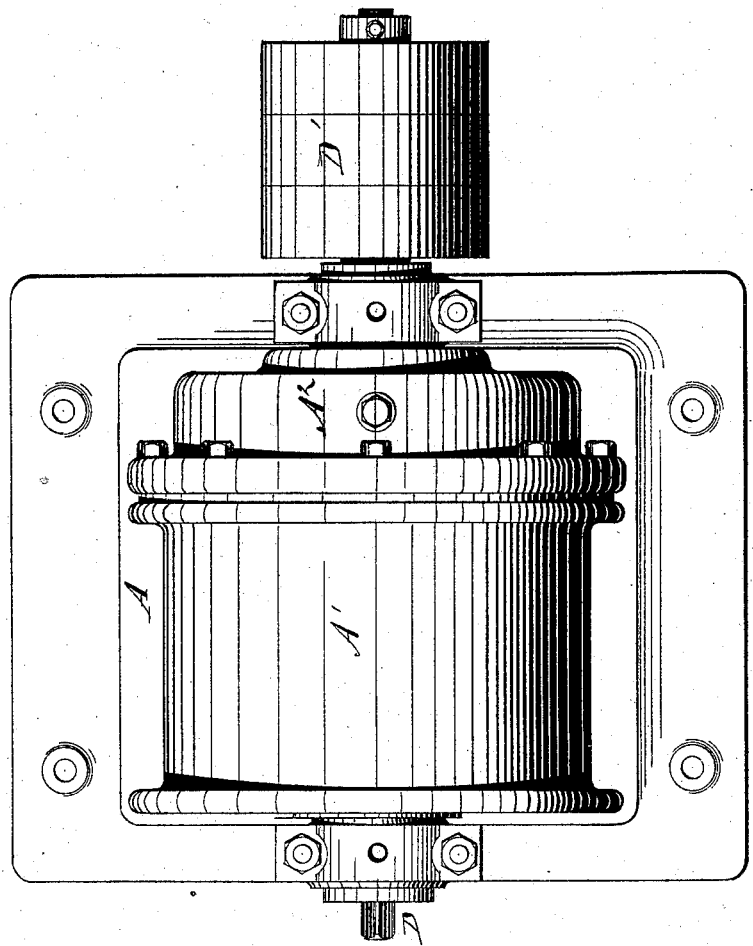
Figure 2:
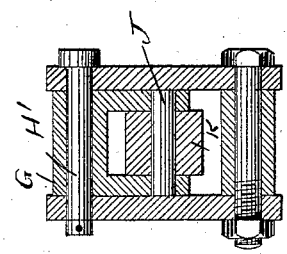
Figure 3:
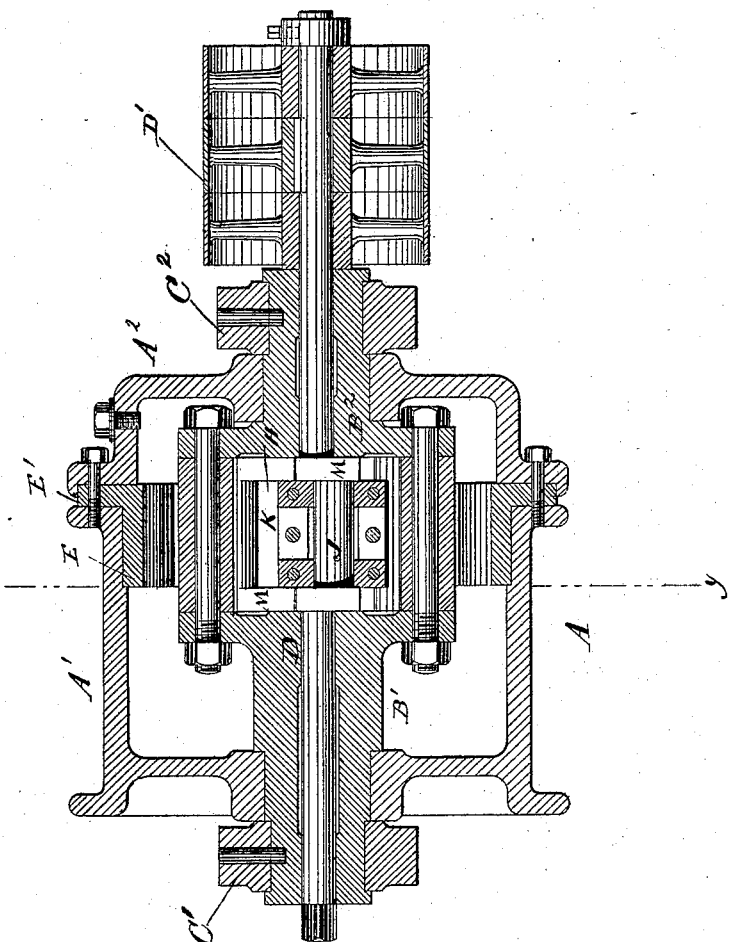
Figure 4:
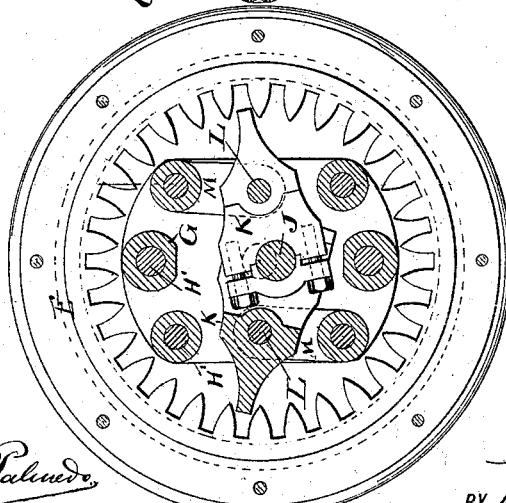

In the accompanying drawings, Figure 1 is a plan view of my improved gearing. Fig. 2 is a cross-sectional view. Fig. 3 is a longitudinal sectional elevation of the gearing; and Fig. 4 is a cross-sectional view on the line $y$ $y$, Fig. 3.

Similar letters of reference indicate corresponding parts.

The drum A is composed of two flanged sections, A' and A², which are mounted to rotate on the sleeves B' B², respectively, said sleeves being journaled and clamped in the bearings C' C², and in said sleeves the shaft D is mounted to revolve. Driving-pulleys D' are mounted on one end of the shaft. Between the flanges of the drum-sections A' A² a flange, E', of an internally-toothed ring, E, is placed, and bolts are passed through the same and the flanges of the drum-sections A' A², the teeth of the ring E projecting from the inner surface of the drum-section A', as shown in Fig. 4. The sleeves B' B² are provided at their inner or adjacent ends with heads, between which a series of sleeves, G, are inserted, through which the bolts H' are passed longitudinally, said bolts being provided with suitable heads and nuts. Thereby a chamber, H, is formed between the heads of the two sleeves. Between the heads of the two sleeves B' B² the shaft D is provided with an eccentric part, J, passing through the inner ends of two rocking pawls, K, mounted to swing on the shafts L, pivoted on arms or links M, projecting downward from two of the sleeves G, which sleeves are mounted to rock on their bolts H', those sleeves on which the arms M are provided being arranged diagonally opposite, as shown in Fig. 4, where one pair of arms M is provided on the upper right-hand sleeve and the other on the lower left-hand sleeve.

The operation is as follows: The shaft D is revolved by means of belts, chains, or other devices, and as the rocking pawls K, mounted on said shaft, engage with the teeth of the ring E, said toothed ring E and the drum are also revolved. By the revolutions of the shaft D the pawls K are reciprocated at the same time that they revolve, and when the toothed end of one pawl is engaged with the teeth of the ring E the other is disengaged, and so on alternately, said alternating engaging and disengaging taking place for each revolution of the shaft D. During the half of a revolution the changing of the position of the pawls takes place, and during the other half but one pawl remains engaged and acts with its full force on the teeth of the toothed ring. The pawls advance the distance of one tooth during each revolution, and thus the proportion of transmission is as one to half the number of teeth.

This gearing can be used for elevators, fire-escapes, cranes, lifting-jacks, derricks, presses, driving-wheels for locomotives, belt-pulleys, &c., in case the speed is to be reduced and loads to be lifted, and for all kinds of machinery. The gearing is always inclosed in the drum, and thus cannot become greasy or clogged, and cannot catch on the chains, pulleys, or objects to be raised, and said drum also forms a chamber for containing the lubricant.

Having thus described my invention, I claim as new and desire to secure by Letters Patent—

1. In a differential gear, the combination, with a toothed ring, of revolving reciprocating pawls engaging the teeth of said ring, substantially as shown and described.

2. A differential gearing consisting of a toothed wheel, a shaft having an eccentric, and reciprocating pawls and sleeves on the shaft, all combined substantially as shown and described.

3. In a differential gear, the combination, with a drum, of a toothed wheel on the inside of said drum and pivoted reciprocating pawls mounted on an eccentric of the driving-shaft, substantially as shown and described.

4. In a differential gearing, the combination, with the driving-shaft, of sleeves mounted loosely on the same, reciprocating pawls mounted on links or arms between the inner ends of the sleeves and on an eccentric part of the shaft between the sleeves, and a drum provided with a toothed ring, with the teeth of which ring the reciprocating pawls can engage, substantially as shown and described.

5. The combination, with the shaft, of two sleeves mounted loosely on the same and having their ends connected by bolts and sleeves on said bolts, links on the sleeves of the bolts, pawls pivoted on said links and mounted on an eccentric part of the shaft, which is between the inner ends of sleeves surrounding the shaft, a drum mounted loosely on the sleeves of the shaft, and a ring having teeth fixed loosely on the drum, substantially as shown and described.

In testimony that I claim the foregoing as my invention I have signed my name in presence of two subscribing witnesses.

CARL G. TOENSE.

Witnesses:
 J. W. SYKORES,
 EDWARD DAVID.